(12) United States Patent
Martino et al.

(10) Patent No.: US 11,065,945 B2
(45) Date of Patent: Jul. 20, 2021

(54) VEHICLE DOOR STRUCTURE

(71) Applicant: NISSAN NORTH AMERICA, INC., Franklin, TN (US)

(72) Inventors: Marlo Martino, Rochester Hills, MI (US); Richard Dryja, Canton, MI (US); Christopher Herrala, Milford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/432,460

(22) Filed: Jun. 5, 2019

(65) Prior Publication Data
US 2020/0384833 A1  Dec. 10, 2020

(51) Int. Cl.
*B60J 5/00* (2006.01)
*B60J 5/04* (2006.01)
*B60R 11/02* (2006.01)

(52) U.S. Cl.
CPC .............. *B60J 5/042* (2013.01); *B60J 5/0413* (2013.01); *B60J 5/0415* (2013.01); *B60R 11/0217* (2013.01)

(58) Field of Classification Search
CPC ... B60J 5/042; B60J 5/04; B60J 5/0451; B60J 5/0425; B60J 5/0416; B60J 5/0455; B60J 5/0458
See application file for complete search history.

(56) References Cited

U.S. PATENT DOCUMENTS

| | | | | |
|---|---|---|---|---|
| 4,434,580 A * | 3/1984 | Engelsberger | ......... | B60J 5/0412 296/146.6 |
| 4,866,883 A * | 9/1989 | Brown | .................... | B60J 5/0416 49/502 |
| 5,001,867 A * | 3/1991 | Dupuy | ................... | B60J 5/0416 49/502 |
| 5,325,632 A * | 7/1994 | Djavairian | ............. | B60J 5/0425 296/146.6 |
| 5,398,453 A * | 3/1995 | Heim | ....................... | B60J 5/042 49/502 |
| 5,542,738 A | 8/1996 | Walker et al. | | |
| 5,934,730 A | 8/1999 | Yagishita et al. | | |
| 6,205,714 B1 * | 3/2001 | Staser | .................... | B60J 5/0416 296/146.6 |
| 6,328,359 B1 * | 12/2001 | Pacella | .................. | B60J 5/0425 293/128 |
| 6,332,641 B1 * | 12/2001 | Okana | .................... | B60J 5/0425 296/146.6 |
| 6,382,707 B1 * | 5/2002 | Dunneback | ............ | B60J 5/0425 296/146.6 |

(Continued)

FOREIGN PATENT DOCUMENTS

DE    102014214321 A1    1/2015
EP         1977936 A2   10/2008
(Continued)

*Primary Examiner* — Gisele D Ford
(74) *Attorney, Agent, or Firm* — Global IP Counselors, LLP

(57) ABSTRACT

A vehicle door structure includes an inner panel, an outer panel, a guard beam and a reinforcing member. The guard beam extends laterally in a cavity between the inner and outer panels. The reinforcing member disposed in the cavity and being positioned on a floor of the vehicle door structure below the guard beam.

16 Claims, 5 Drawing Sheets

(56) References Cited

U.S. PATENT DOCUMENTS

| | | | | |
|---|---|---|---|---|
| 6,640,500 B1* | 11/2003 | Stout | B60J 5/0416 | 296/146.7 |
| 6,672,648 B2* | 1/2004 | Heranney | B60J 5/0451 | 296/146.6 |
| 6,732,474 B1* | 5/2004 | Eck | B60J 5/0416 | 49/502 |
| 7,857,375 B2* | 12/2010 | Huttsell | B60R 21/0428 | 296/146.6 |
| 8,256,825 B1* | 9/2012 | Dryja | B62D 25/07 | 296/146.8 |
| 9,592,721 B1* | 3/2017 | Kelly | B60J 5/0425 | |
| 10,214,082 B2 | 2/2019 | Nagaishi et al. | | |
| 2001/0017476 A1 | 8/2001 | Nishikawa et al. | | |
| 2001/0025456 A1* | 10/2001 | Furuyama | B60R 13/02 | 49/502 |
| 2002/0095870 A1* | 7/2002 | Praud | B60J 5/0416 | 49/502 |
| 2002/0153718 A1* | 10/2002 | Schneider | B60J 5/042 | 280/748 |
| 2002/0171260 A1* | 11/2002 | Schneider | B60J 5/043 | 296/146.6 |
| 2002/0180236 A1* | 12/2002 | Blomeling | B60R 13/02 | 296/146.5 |
| 2003/0140566 A1* | 7/2003 | Sommer | B60J 5/0408 | 49/502 |
| 2003/0188492 A1* | 10/2003 | Bonnett | B60J 5/0483 | 49/502 |
| 2004/0026957 A1* | 2/2004 | Bodin | B60J 5/0465 | 296/146.6 |
| 2004/0080179 A1* | 4/2004 | Okazaki | B60J 5/043 | 296/146.6 |
| 2004/0119318 A1* | 6/2004 | Moriyama | B60J 5/0429 | 296/146.6 |
| 2004/0123446 A1* | 7/2004 | O'Brien | B60J 5/0416 | 29/469 |
| 2005/0206191 A1* | 9/2005 | Bodin | B60J 5/0455 | 296/146.6 |
| 2005/0264028 A1* | 12/2005 | Bodin | B60J 5/0425 | 296/146.6 |
| 2006/0290166 A1* | 12/2006 | Gehringhoff | B60J 5/0429 | 296/146.6 |
| 2007/0039245 A1* | 2/2007 | Buchta | E05F 11/382 | 49/502 |
| 2007/0090666 A1* | 4/2007 | Brennecke | B60J 5/0451 | 296/146.6 |
| 2007/0102955 A1* | 5/2007 | Bodin | B60J 5/0425 | 296/146.6 |
| 2007/0102964 A1* | 5/2007 | Yoshimoto | B60J 5/0448 | 296/187.12 |
| 2007/0145770 A1* | 6/2007 | Katou | B60J 5/0429 | 296/146.6 |
| 2007/0187986 A1* | 8/2007 | Wikstrom | B60J 5/0429 | 296/146.6 |
| 2008/0222962 A1* | 9/2008 | Staser | E05F 11/488 | 49/502 |
| 2009/0146451 A1* | 6/2009 | Broadhead | B60J 5/0448 | 296/146.6 |
| 2009/0165392 A1* | 7/2009 | Totani | B60J 5/0412 | 49/502 |
| 2009/0184501 A1* | 7/2009 | Hirotani | B60R 21/21 | 280/730.2 |
| 2009/0236871 A1* | 9/2009 | Shibasaki | B60J 5/0455 | 296/146.6 |
| 2010/0225141 A1* | 9/2010 | Mori | B62D 21/157 | 296/146.6 |
| 2011/0025094 A1* | 2/2011 | Eipper | B60J 5/0455 | 296/187.01 |
| 2011/0037288 A1* | 2/2011 | Yoshioka | B60J 5/0429 | 296/146.6 |
| 2011/0101733 A1* | 5/2011 | Anderson | B60J 5/06 | 296/187.12 |
| 2011/0113697 A1* | 5/2011 | Sachdev | B60J 5/0436 | 49/502 |
| 2011/0169302 A1 | 7/2011 | Deng et al. | | |
| 2011/0204679 A1* | 8/2011 | Deng | B60J 5/0461 | 296/187.12 |
| 2011/0221229 A1* | 9/2011 | Rouhana | B60J 5/042 | 296/146.6 |
| 2011/0278880 A1* | 11/2011 | Tsuyuzaki | B62D 25/087 | 296/187.11 |
| 2012/0007386 A1* | 1/2012 | Kriese | B60J 5/0416 | 296/146.5 |
| 2012/0036780 A1* | 2/2012 | Pleiss | B60J 5/0416 | 49/70 |
| 2013/0049397 A1* | 2/2013 | Cohoon | B60J 5/0437 | 296/146.6 |
| 2013/0057018 A1* | 3/2013 | Reese | B60J 5/042 | 296/146.6 |
| 2013/0074413 A1* | 3/2013 | Moriya | B60J 5/042 | 49/394 |
| 2013/0168996 A1* | 7/2013 | Svedberg | B60J 5/0433 | 296/146.6 |
| 2013/0168997 A1* | 7/2013 | Kurokawa | B60J 5/0451 | 296/146.6 |
| 2013/0199098 A1* | 8/2013 | Kriese | E06B 3/44 | 49/417 |
| 2013/0341961 A1* | 12/2013 | Mori | B60R 13/04 | 296/146.2 |
| 2014/0246879 A1* | 9/2014 | Ishigame | B60J 5/0437 | 296/146.6 |
| 2014/0367947 A1* | 12/2014 | Torii | B60J 5/0461 | 280/730.2 |
| 2015/0151616 A1* | 6/2015 | Makowski | B60J 5/0456 | 296/146.6 |
| 2015/0352930 A1* | 12/2015 | Belpaire | B62D 29/002 | 428/34.1 |
| 2015/0352932 A1* | 12/2015 | Mildner | B60J 5/0429 | 296/193.05 |
| 2016/0229269 A1* | 8/2016 | Kawabe | B60J 5/0402 | |
| 2016/0280048 A1* | 9/2016 | Friedman | B60J 5/0468 | |
| 2016/0288629 A1* | 10/2016 | Hu | B22D 17/00 | |
| 2016/0303952 A1* | 10/2016 | Hoff | B60J 5/0443 | |
| 2016/0362923 A1* | 12/2016 | Choi | E05D 15/1081 | |
| 2017/0036521 A1* | 2/2017 | Ogawa | B62D 29/04 | |
| 2017/0136856 A1* | 5/2017 | Sugie | B60J 5/0493 | |
| 2017/0240029 A1* | 8/2017 | Moriyama | B60J 5/0433 | |
| 2017/0274744 A1* | 9/2017 | Hirakawa | B60J 5/0447 | |
| 2017/0274838 A1* | 9/2017 | Kim | B29C 45/14786 | |
| 2017/0313165 A1* | 11/2017 | Fortin | B60J 5/0416 | |
| 2017/0314306 A1* | 11/2017 | Fortin | B60J 5/0416 | |
| 2017/0326954 A1* | 11/2017 | Peidro Aparici | B60J 5/0427 | |
| 2018/0029646 A1* | 2/2018 | Kanagai | B60J 5/06 | |
| 2018/0134129 A1* | 5/2018 | Choi | B60J 5/0437 | |
| 2018/0141415 A1* | 5/2018 | Baccouche | B29D 99/0003 | |
| 2018/0162206 A1* | 6/2018 | Seong | B60J 5/0456 | |
| 2018/0170156 A1* | 6/2018 | Kwak | B60J 5/0443 | |
| 2018/0208029 A1* | 7/2018 | Tanaka | B60J 5/0437 | |
| 2018/0222295 A1* | 8/2018 | Schlachter | B60J 5/0448 | |
| 2019/0084386 A1* | 3/2019 | Tanaka | B60J 5/0443 | |
| 2020/0130482 A1* | 4/2020 | Benson | B60J 5/0458 | |

FOREIGN PATENT DOCUMENTS

| | | |
|---|---|---|
| JP | 2012111380 A | 6/2012 |
| JP | 2013237294 A | 11/2013 |
| RU | 180276 U1 | 6/2018 |

* cited by examiner

1

VEHICLE DOOR STRUCTURE

BACKGROUND

Field of the Invention

The present invention generally relates to vehicle door structure. More specifically, the present invention relates to vehicle door structure having a reinforcement area.

Background Information

Vehicle door structures typically include inner and outer panels that are fixedly attached with a cavity extending therebetween. Vehicle door structures can include reinforcing members that are disposed in the cavity separating the inner and outer panels to enhance the robustness of the vehicle door structure during use. A robustness enhancer can include shock absorption members, energy absorption members and/or impact absorption members that are sized and dimensioned to reinforce the structure stability of vehicle door structures.

SUMMARY

In view of the state of the known technology, one aspect of the present disclosure is to provide a vehicle door structure comprising an inner panel, an outer panel, a guard beam and a reinforcing member. The guard beam extends laterally in a cavity between the inner and outer panels. The reinforcing member is disposed in the cavity and is positioned on a floor of the vehicle door structure below the guard beam.

In view of the state of the known technology, another aspect of the present disclosure is to provide a vehicle door structure comprising an inner panel, an outer panel, a guard beam and a reinforcing member. The inner panel has a front hem and a rear hem. The outer panel is separated from the inner panel by a cavity. The cavity includes a reinforcement area. The guard beam is disposed in the cavity and extends laterally between the inner and outer panels above the reinforcement area. The reinforcing area is defined by the front hem, a floor of the vehicle door structure and the guard beam. The reinforcing member is disposed in the reinforcement area and is positioned on the floor of the vehicle door structure below the guard beam.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
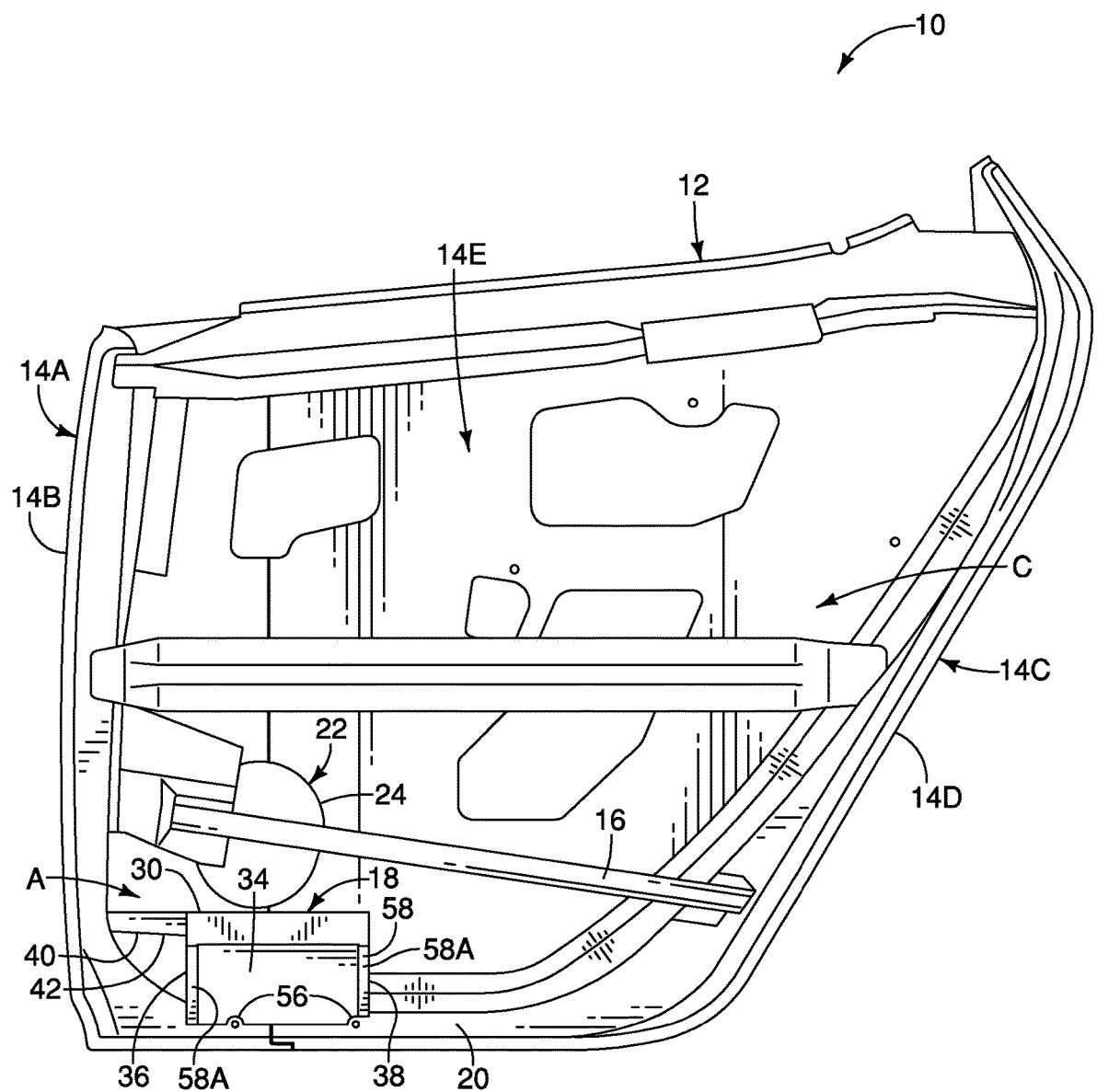
FIG. 1 is a elevational plan view of an inner panel of a vehicle door structure being equipped with a reinforcing member in accordance with an illustrated embodiment.
Figure 2:
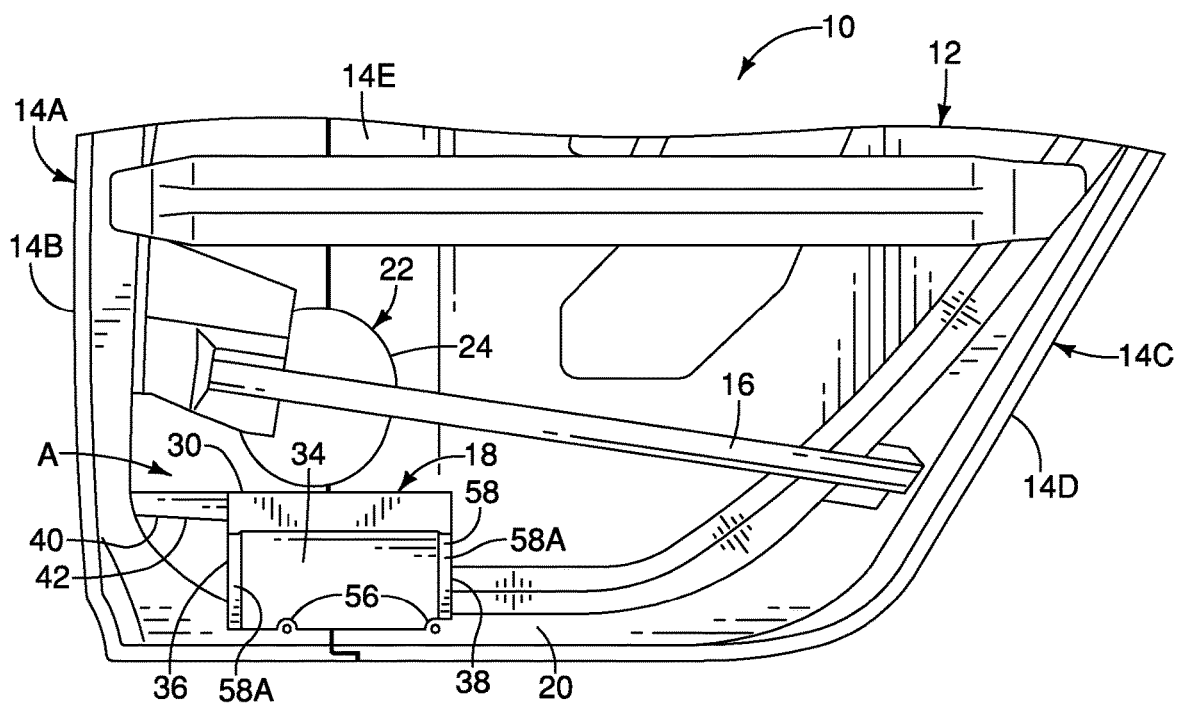
FIG. 2 is an enlarged view of a portion of the inner panel of FIG. 1 showing the reinforcing member disposed in a reinforcement area.
Figure 3:
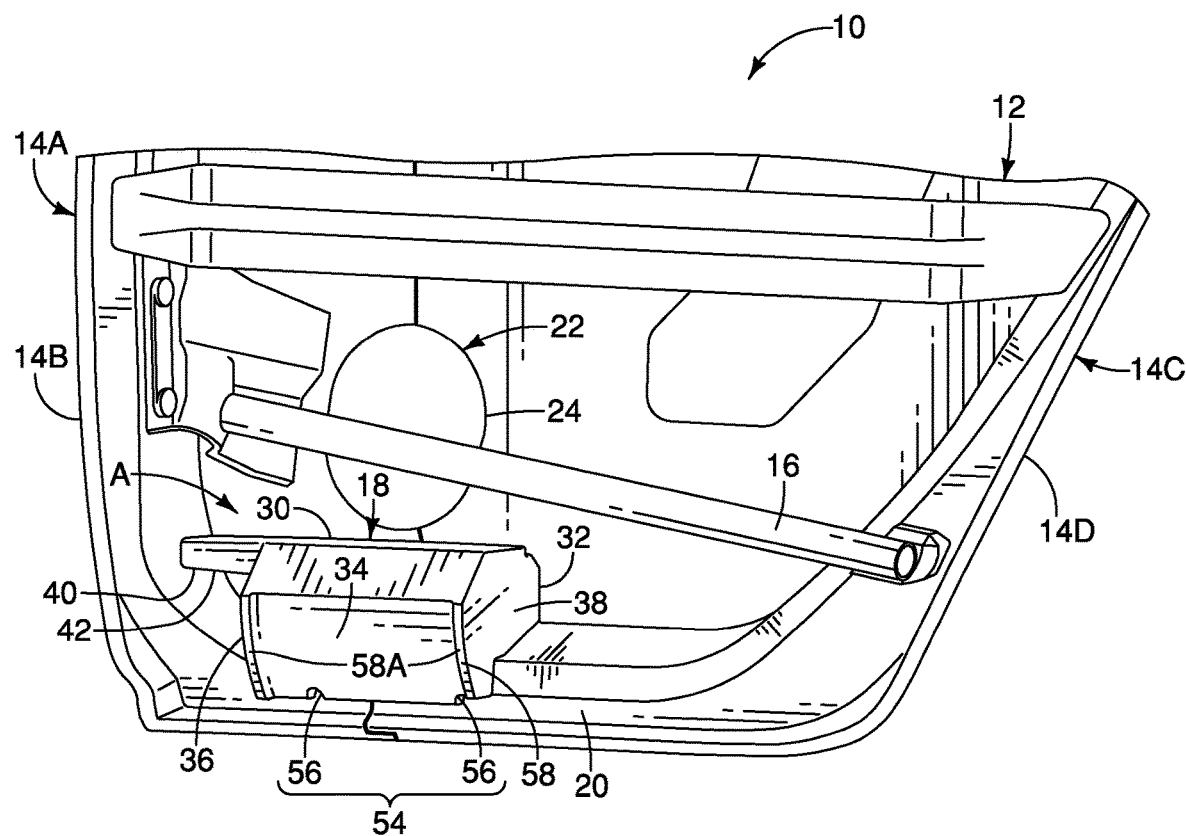
FIG. 3 is a perspective view of the portion of the inner panel of FIG. 2.
Figure 6:
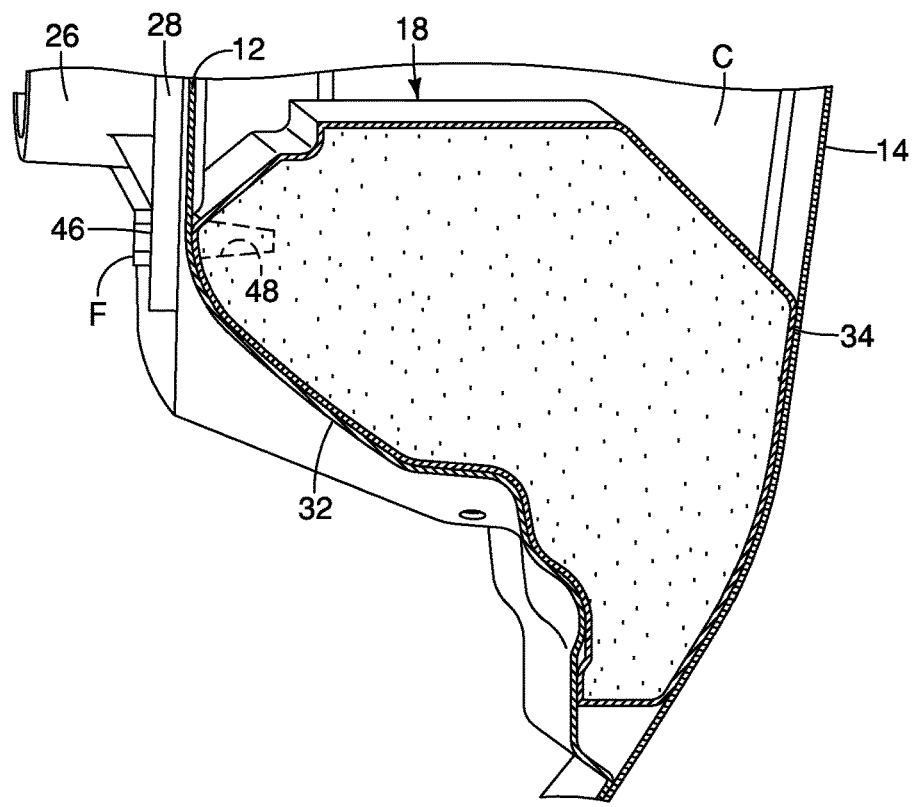
FIG. 6 is a cross-sectional view of the reinforcing member installed in the reinforcement area between the inner panel and an outer panel of the vehicle door structure.

Referring initially to FIGS. 1 and 6, a vehicle door structure 10 of a vehicle is illustrated comprising an inner panel 12 and an outer panel 14. The inner and outer panels 12 and 14 are attached in a conventional manner, such as by fasteners, screws, clips and/or welding. The inner and outer panels 12 and 14 are separated by a cavity C of the vehicle door structure 10, as best seen in FIGS. 1 to 3. In the illustrated embodiment, the vehicle door structure 10 further comprises a guard beam 16 extending laterally in the cavity C between the inner and outer panels 12 and 14. The cavity C includes a reinforcement area A for absorbing energy created during an external impact to the vehicle door structure 10. In particular, the vehicle door structure 10 includes a reinforcing member 18 that is disposed in the reinforcement area A to absorb energy during external impact to the vehicle. The reinforcing member 18 of the illustrated embodiment absorbs energy so to help maintain a structural integrity of the vehicle door structure 10 during external impact. Thus, the reinforcing member 18 can be considered a robustness enhancer of the vehicle door structure 10, as will be discussed below.

Referring to FIG. 1, the inner panel 12 includes a front part 14A having a front hem 14B of the vehicle door structure 10 and a rear part 14C having a rear hem 14D of the vehicle door structure 10. As shown, inner panel 12 is illustrated as including a floor 20 that is considered a floor of the vehicle door structure 10. While the floor 20 is illustrated as being a part of the inner panel 12, it will be apparent to those skilled in the vehicle field from this disclosure that the floor 20 of the vehicle door structure 10 can alternatively be a separate panel that is fixedly connected to the inner and outer panels 12 and 14 in a conventional manner.

The front and rear parts 14A and 14C of the inner panel 12 are preferably steel plates fixedly connected to each other in a conventional manner (e.g., with fasteners, screws and/or clips) with the front part 14A typically being thicker to support the hinges that attach the door to the body and to absorb energy from a forward impact to the vehicle. Together, the front and rear parts 14A and 14C form a stamped surface 14E of the inner panel 12. Therefore, the inner panel 12 includes the stamped surface 14E that includes a plurality of indentations and/or protrusions for contacting and mating with positioning structures 40 of the reinforcing member 18, as will be further discussed below. As shown, the stamped surface 14E includes a plurality of service openings 22 for receiving and supporting vehicle accessory components. Specifically, the inner panel 12 includes a speaker mounting hole 24 for receiving and supporting a vehicle speaker 26 of an audio system of the vehicle having the vehicle door structure 10. In the illustrated embodiment, the front and rear parts 14A and 14C are aligned to form the speaker mounting hole 24. It will be apparent to those skilled in the vehicle field from this disclosure that the speaker mounting hole 24 can alternatively be disposed solely on the front part 14A or solely on the rear part 14C.

Figure 4:
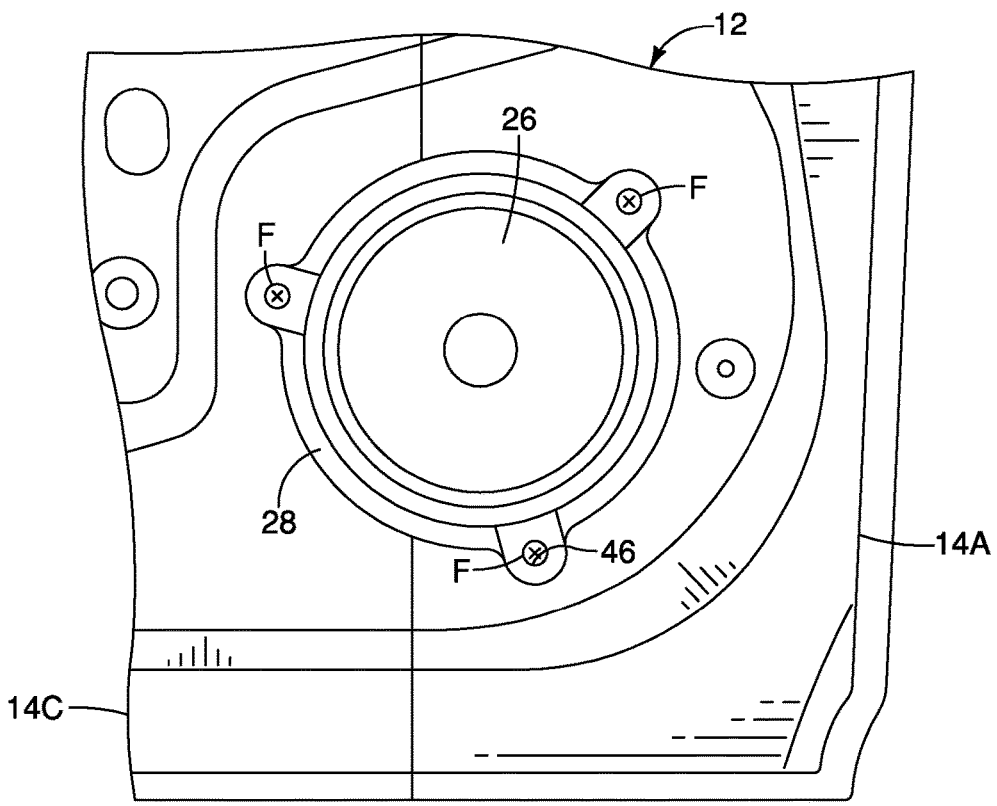
FIG. 4 is an enlarged view of the vehicle door structure showing a speaker mounted on the inner panel.

As seen in FIG. 4, the vehicle door structure 10 is further provided with a speaker 26 that is mounted in the speaker mounting hole 24 and secured to the inner panel 12. The vehicle door is also provided with a speaker seal or baffle plate 28 that is preferably made of a material which absorbs or damps unwanted vibrations. The baffle plate 28 has a size and a shape corresponding to the speaker 26 and the speaker mounting hole 24 so that the speaker mounting hole 24 is entirely covered once the speaker 26 and the baffle plate 28 are installed onto the inner panel 12. Preferably, the baffle plate 28 is substantially flush with the stamped surface 14E of the inner panel 12 to reduce the road noise by improving the rigidity of the inner panel 12. The speaker 26 is mounted to the speaker mounting hole 24 and is fixed to the baffle plate 28 by fasteners F such as screws and/or rivets.

Referring to FIG. 6, the outer panel 14 is separated from the inner panel 12 by the cavity C. The outer panel 14 can also be made of stamped metal such as steel. Alternatively, the outer panel 14 can be made of fiber-reinforced resin formed, for example, by laminating a plurality of fiber-reinforced resin sheets, and pressurizing and curing the resin sheets. In the illustrated embodiment, the reinforcing member 18 is disposed in the reinforcement area A between the inner and outer panel 14 such that the reinforcing member 18 directly contacts both the inner and outer panels 12 and 14. In other words, the reinforcing member 18 is sized and dimensioned to be disposed between the inner and outer panels 12 and 14 in a snug fit to prevent substantial vibration or movement of the reinforcing member 18 during operation of the vehicle or the vehicle door structure 10. Therefore, the reinforcing member 18 is supported by both the front and rear parts 14A and 14C of the inner panel 12.

As shown in FIGS. 1 to 3, the guard beam 16 is fixedly connected to the front part 14A and the rear part 14C and is secured therein by suitable means such as hem-flanging and/or welding. The guard beam 16 is disposed in the cavity C and extends laterally between the inner and outer panels 12 and 14. The guard beam 16 is an example of a side impact door beam that can be made of steel or aluminum. The guard beam 16 can be an extruded tube, or can be a stamped channel. In the illustrated embodiment, the guard beam 16 extends across the speaker mounting hole 24 of the inner panel 12. In particular, the guard beam 16 extends above the reinforcement area A. In the illustrated embodiment, the reinforcement area A is defined by the front part 14A, the floor 20 and the guard beam 16. In this disclosure, the reinforcement area A refers to the area around and adjacent to the guard beam 16, the floor 20 and the front part 14A. However, it will be apparent to those skilled in the vehicle field from this disclosure that the reinforcement area A can alternatively be an area defined by the rear part 14C, the floor 20 and the guard beam 16. That is, it will be apparent to those skilled in the vehicle field from this disclosure that the reinforcing member 18 can be modified and implemented for another reinforcement area that is adjacent to the rear part 14C. Additionally, the reinforcing member 18 can be implemented with vehicle door structures having inner and outer panels having different shapes, sizes, configuration and structure.

The reinforcing member 18 reinforces the vehicle door structure 10 at the reinforcement area A to prevent to prevent destabilization of the vehicle door structure 10 in the area near the guard beam 16. In particular, the reinforcing member 18 helps prevent the outer panel 14 from curling in the area near the guard beam 16 due to an external impact. By being disposed in the cavity C of the vehicle door structure 10 adjacent to the guard beam 16, the reinforcing member 18 helps prevent the destabilization of the outer panel 14 in the area near the guard beam 16. Thus, the reinforcing member 18 reinforces the stability of the vehicle door structure 10 so to prevent the inner and outer panels 12 and 14 from destabilizing in the event of an external impact. In this way, the reinforcing member 18 is a robustness enhancer of the vehicle door structure 10.

As shown, the reinforcing member 18 is disposed in the cavity C and is positioned on the floor 20 of the vehicle door structure 10 substantially below the guard beam 16. That is, a main body 30 of the reinforcing member 18 is disposed below the guard beam 16. However, it will be apparent to one skilled in the vehicle field from this disclosure that the reinforcing member 18 can be at least partially attached to or fixed to the guard beam 16 to reinforce the vehicle door structure 10. Also as shown in the illustrated embodiment, the reinforcing member 18 is disposed below the speaker mounting hole 24. However, it will be apparent to one skilled in the vehicle field from this disclosure that the reinforcing member 18 can extend over or partially over the speaker mounting hole 24.

Figure 7:
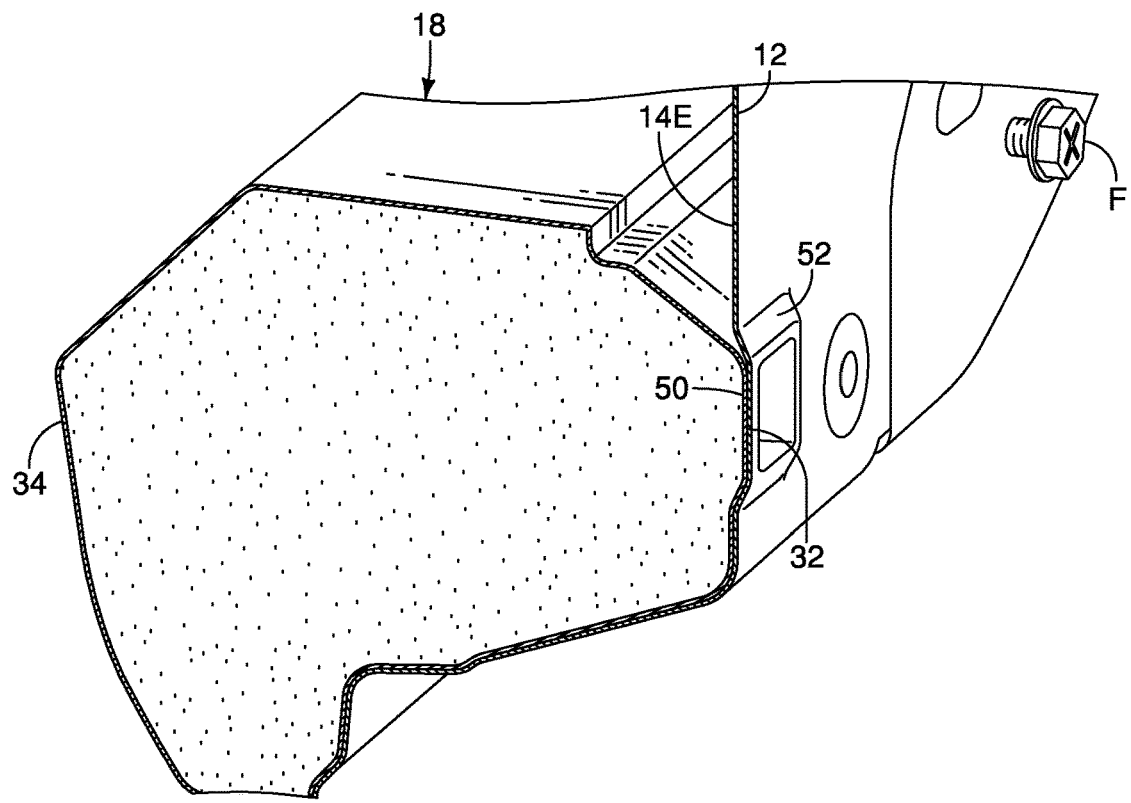
FIG. 7 is a cross-sectional view of the reinforcing member installed and contacting the inner panel.

Referring to FIGS. 6 to 9, the reinforcing member 18 includes an inboard facing side 32, an outboard facing side 34, a forward facing side 36 and a rearward facing side 38. In this disclosure, "forward" refers to a direction facing toward a forward or front end of the vehicle equipped with the vehicle door structure 10. In this disclosure, "rearward" refers to a direction facing toward a rearward or rear end of the vehicle equipped with the vehicle door structure 10. The inboard facing side 32 contacts the stamped surface 14E of the inner panel 12 as best seen in FIGS. 3 and 7. In particular, inboard facing side 32 has a shape and dimension that substantially conforms to a shape and dimension of the inner panel 12. The inboard facing side 32 aligns with and contacts the stamped surface 14E of the inner panel 12. The outboard facing side 34 similarly has a shape and dimension that substantially conforms to a shape and dimension of the outer panel 14. Therefore, the outboard facing side 34 contacts the outer panel 14.

As best seen in FIGS. 1 to 3, the forward facing side 36 contacts a lateral wall of the front part 14A. In particular, the forward facing side 36 includes a positioning structure 40 extending from the main body 30. Therefore, the reinforcing member 18 includes at least one positioning structure 40. The reinforcing member 18 has an extension 42 extending from the main body 30 at the forward facing side 36 of the reinforcing member 18. Therefore, the extension 42 contacts the lateral wall of the front part 14A of the inner panel 12 and is a positioning structure 40 of the reinforcing member 18. The extension 42 serves to anchor the reinforcing member 18 against the inner panel 12. The extension 42 also serves to position the reinforcing member 18 relative to the inner and outer panels 12 and 14 to be in the reinforcement area A. In other words, the extension 42 is considered a positioning structure of the reinforcing member 18. As shown, the extension 42 contacts the lateral wall of the front part 14A to anchor the reinforcing member 18 against the lateral wall of the front part 14A. In the illustrated embodiment, as best seen in FIG. 3, the rearward facing side 38 sits on and contacts the rear part 14C. The reinforcing member 18 is preferably wedged against the floor 20 at the rearward facing side 38 and is anchored against the lateral wall of the front part 14A at the forward facing side 36. It will be apparent to those skilled in the vehicle field from this disclosure that the reinforcing member 18 can be anchored against other structures of the inner and outer panels 12 and 14 so long as to ensure a snug fit of the reinforcing member 18 in the reinforcement area A.

Figure 5:
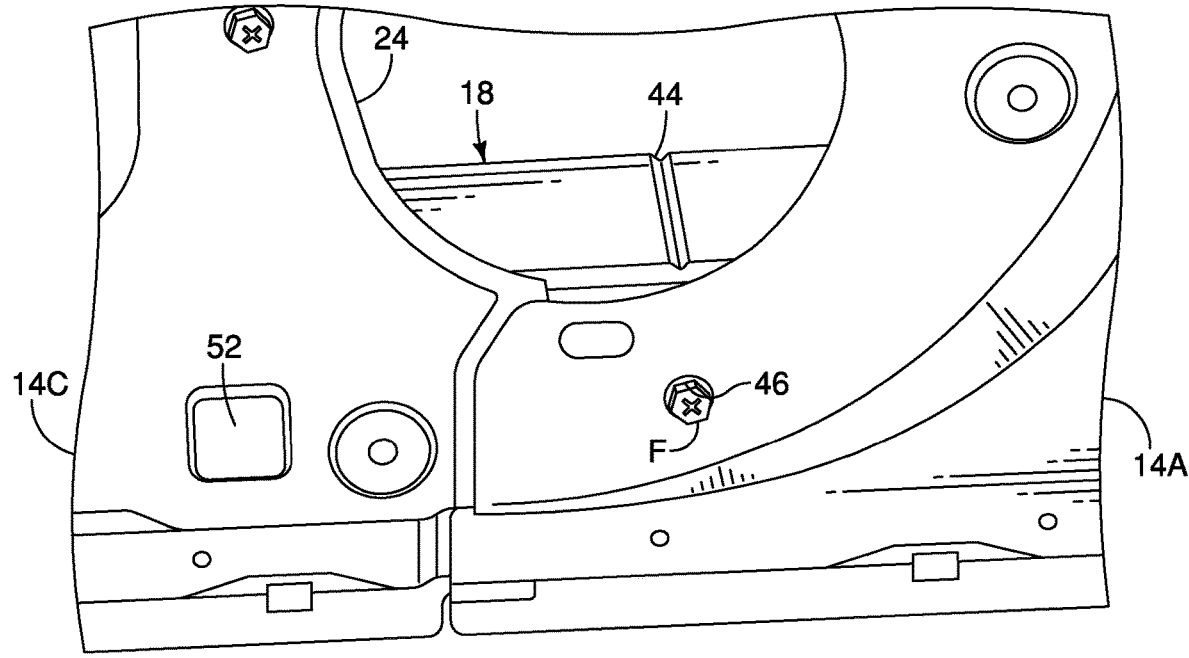
FIG. 5 is an enlarged view of the vehicle door structure similar to FIG. 4 with the speaker removed to show the reinforcing member.

The extension 42 has a length such that a position indicator 44 of the reinforcing member 18 aligns with a structure of the inner panel 12. More specifically, as best seen in FIG. 5, the position indicator 44 aligns with the fastener F or a fastener receiving hole 46 of the inner panel 12 when the extension 42 contacts the lateral wall of the front part 14A. That is, during installation of the reinforcing member 18 to the reinforcement area A, the reinforcing member 18 is preferably disposed in the reinforcement area A such that the position indicator 44 aligns with the fastener F or the fastener receiving hole 46. It will be apparent to those skilled in the vehicle field from this disclosure from this disclosure that the positioning of the reinforcing member 18 with respect to the inner panel 12 can utilize a different type of positioning mechanism and/or different type of position indicator(s). Also, while the position indicator 44 of the reinforcing member 18 is illustrated as being an elongated divot extending along a top surface of the reinforcing member 18, it will be apparent to those skilled in the vehicle field from this disclosure that the reinforcing member 18 can include other types of indications and or markings as needed and/or necessary.

Figure 9:
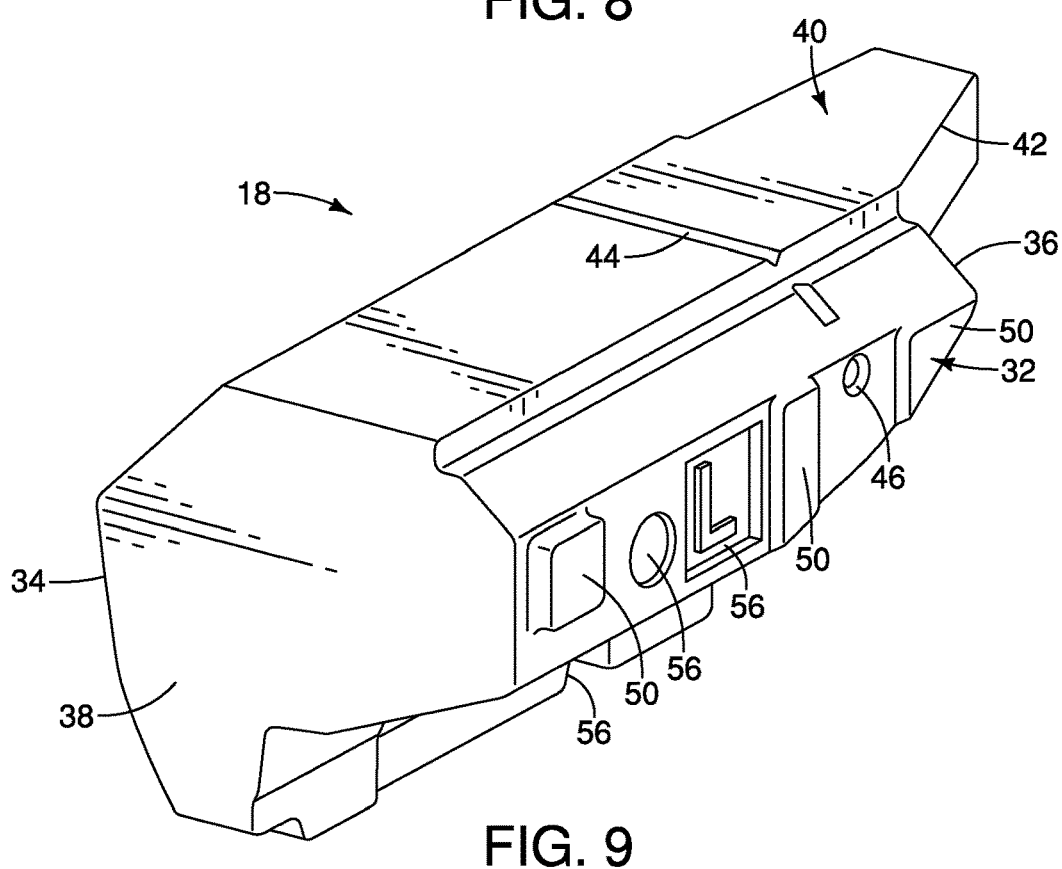
FIG. 9 is another elevated perspective view of the reinforcing member.

As best seen in FIG. 6, the reinforcing member 18 includes an opening for receiving the fastener F that fastens the speaker to the vehicle door structure 10. In particular, the reinforcing member 18 includes a blind bore 48 for receiving the fastener F that mounts the speaker to the inner panel 12. It will be apparent to those skilled in the vehicle field from this disclosure that the receiving hole can be various types of structures for securing the reinforcing member 18 to the inner and outer panels 12 and 14. Also, while the fastener F is illustrated as being a screw, it will be apparent to those skilled in the vehicle field from this disclosure that alternative types of fasteners can be utilized with the illustrated embodiment, such as a rivet. As best seen in FIGS. 5, 6 and 9, the blind bore 48 is positioned relative with the position indicator 44 so that the position indicator 44 is positioned over the blind bore 48. Thus, during installation, the position indicator 44 indicates that the reinforcing member 18 has been installed appropriately in the reinforcement area A such that the blind bore 48 corresponds with the position of the fastener receiving hole 46 of the inner panel 12. As seen in FIG. 5, the position indicator 44 is positioned over the fastener receiving hole 46 when the reinforcing member 18 is installed in the reinforcement area A. Further, as best seen in FIGS. 4 and 6, the fastener F fastens the speaker 26, the baffle plate 28, the inner panel 12 and the reinforcing member 18 together.

Referring to FIGS. 5 to 9, the reinforcing member 18 further includes a plurality of contact steps 50 disposed on the inboard facing side 32 of the reinforcing member 18. The contact steps 50 of the reinforcing member 18, best seen in FIG. 9, are also considered positioning structures of the reinforcing member 18. The contact steps 50 are received by and contact corresponding contact steps 52 of the stamped surface 14E of the inner panel 12, best seen in FIG. 9. The contact steps 50 and the corresponding contact steps 52 are similarly sized and dimensioned for a snug fit. For example, as seen in FIG. 7, the rear part 14C includes a corresponding contact step 52 that receives the contact step 50 of the reinforcing member 18. Therefore, the stamped surface 14E includes the plurality of corresponding contact steps 52 that contacts and receives the contact steps 50 of the reinforcing member 18. It will be apparent to those skilled in the vehicle field from this disclosure that the reinforcing member 18 can include different types of contact steps 50 of different sizes and dimensions as needed to correspond to different sizes and dimensions of corresponding contact steps 52 of the inner and outer panels 12 and 14.

Figure 8:
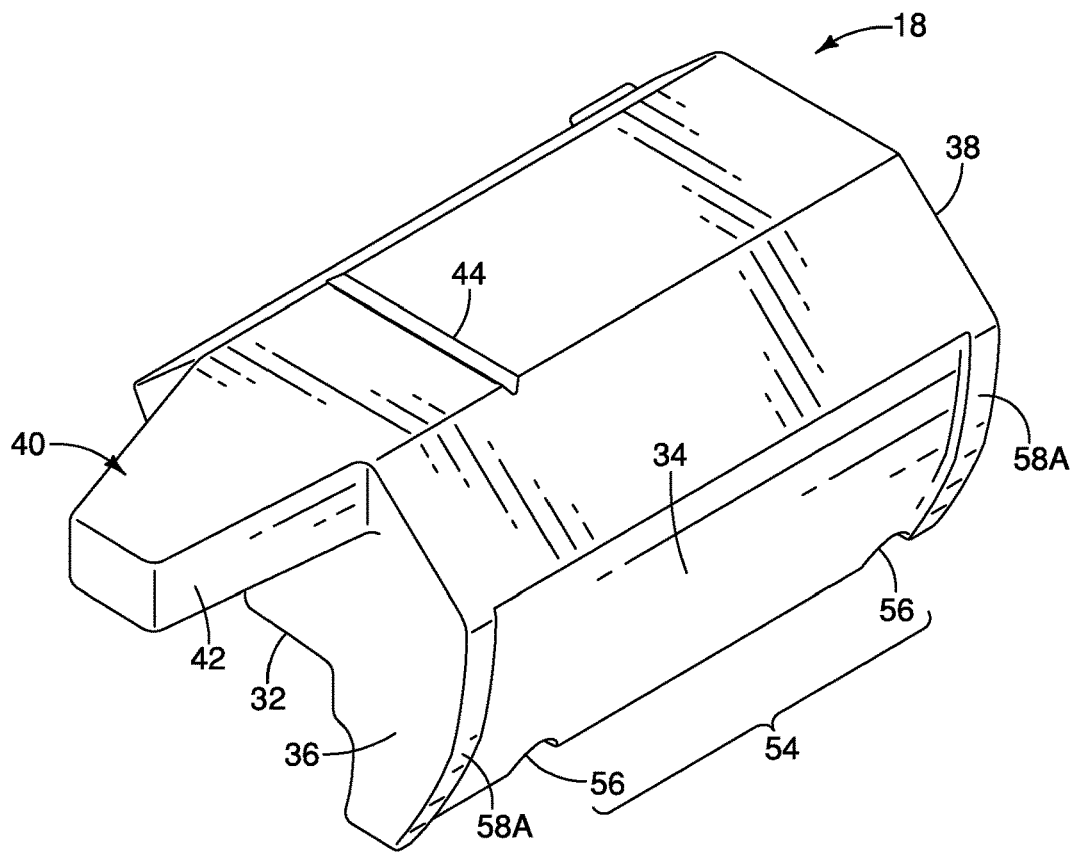
FIG. 8 is an elevated perspective view of the reinforcing member.

The reinforcing member 18 preferably also includes at least one clearance structure. For example, as best seen in FIGS. 8 to 9, the reinforcing member 18 includes a plurality of embossed recessed portions 56 that receive corresponding extensions and/or protrusions from the stamped surface 14E of the inner panel 12 or other fastening structures of the vehicle door structure 10. The reinforcing member 18 preferably further includes at least one crush structure 58. For example, FIG. 8 shows a pair of crush ribs 58A extending from the outboard facing side 34 of the reinforcing member 18. The crush ribs 58A crush against outer panel 14 during installation to allow reinforcing member 18 to fit snugly between outer panel 14 and inner panel 12. It will be apparent to those skilled in the vehicle field from this disclosure that the reinforcing member 18 can include additional crush structures at alternative positions on the reinforcing member 18 as needed and/or desired.

Preferably, the reinforcing member 18 of the illustrated embodiment has a density ranging from 3 pounds per cubic foot to 8 pounds per cubic foot. More preferably, the reinforcing member 18 has a density ranging from 4 pounds per cubic foot to 6 pounds per cubic foot. More preferably, the reinforcing member 18 has a density of 5 pounds per cubic foot.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above" "downward", "vertical", "horizontal", "below" and "transverse" as well as any other similar directional terms refer to those directions of a vehicle equipped with the vehicle door structure. Accordingly, these terms, as utilized to describe the present invention should be interpreted relative to a vehicle equipped with the vehicle door structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle door structure comprising:
an inner panel;
an outer panel;
a guard beam extending laterally in a cavity between the inner and outer panels, the guard beam extending across a speaker unit mounting hole of the inner panel; and
a reinforcing member disposed in the cavity and being positioned on a floor of the vehicle door structure below the guard beam, the floor of the vehicle door structure having a bottommost surface of the cavity, the reinforcing member being disposed substantially directly below the speaker unit mounting hole.

2. The vehicle door structure according to claim 1, wherein
the reinforcing member includes an inboard facing surface that aligns with and contacts a stamped surface of the inner panel.

3. A vehicle door structure comprising:
an inner panel;
an outer panel;
a guard beam extending laterally in a cavity between the inner and outer panels; and
a reinforcing member disposed in the cavity and being positioned on a floor of the vehicle door structure below the guard beam, the floor of the vehicle door structure having a bottommost surface of the cavity,
the reinforcing member includes an inboard facing surface that aligns with and contacts a stamped surface of the inner panel,
the reinforcing member including a positioning structure having an extension extending from a forward facing side of the reinforcing member, the extension contacting a front hem of the inner panel.

4. The vehicle door structure according to claim 3, wherein
the reinforcing member includes a plurality of contact steps disposed on the inboard facing side of the reinforcing member.

5. The vehicle door structure according to claim 4, wherein
the stamped surface of the inner panel includes a plurality of corresponding contact steps that contacts and receives the contact steps of the reinforcing member.

6. The vehicle door structure according to claim 5, wherein
the inner panel includes a front part having a front hem and a rear part having a rear hem of the vehicle door structure, the reinforcing member being supported by both the front and rear parts.

7. The vehicle door structure according to claim 6, wherein
the front part includes at least one of the plurality of corresponding contact steps for receiving one of the plurality of contact steps of the reinforcing member, and
the rear part includes at least one of the plurality of corresponding contact steps for receiving another one of the plurality of contact steps of the reinforcing member.

8. The vehicle door structure according to claim 1, wherein
the inner panel includes a front part having a front hem and a rear part having a rear hem of the vehicle door structure, the reinforcing member being disposed on both the front and rear parts.

9. The vehicle door structure according to claim 8, wherein
the guard beam is fixedly connected to the front part and the rear part.

10. The vehicle door structure according to claim 9, wherein
the front and rear parts are aligned to form the speaker mounting hole.

11. The vehicle door structure according to claim 10, further comprising
a speaker mounted in the speaker mounting hole and secured to the inner panel.

12. The vehicle door structure according to claim 11, wherein
the reinforcing member includes a blind bore for receiving a fastener that mounts the speaker to the inner panel.

13. The vehicle door structure according to claim 1, wherein
the reinforcing member includes an inboard facing surface that contacts a stamped surface of the inner panel, an outboard facing surface that contacts the outer panel, and a front hem facing surface that contacts a front hem.

14. A vehicle door structure comprising:
an inner panel having a front hem and a rear hem;
an outer panel separated from the inner panel by a cavity, the cavity including a reinforcement area;
a guard beam disposed in the cavity and extending laterally between the inner and outer panels above the reinforcement area, the guard beam extending across a speaker unit mounting hole of the inner panel, the reinforcing area being defined by the front hem, a floor of the vehicle door structure and the guard beam, the floor of the vehicle door structure having a bottommost surface of the cavity; and
a reinforcing member disposed in the reinforcement area and being positioned on the floor of the vehicle door structure below the guard beam, the reinforcing member being disposed substantially directly below the speaker unit mounting hole.

15. The vehicle door structure according to claim 14, wherein
the inner panel includes a front part having the front hem and a rear part having the rear hem, the reinforcing member being disposed on both the front and rear parts.

16. The vehicle door structure according to claim 15, wherein
the reinforcing member includes an inboard facing surface that contacts a stamped surface of the inner panel, an outboard facing surface that contacts the outer panel, a front hem facing surface that contacts the front hem,
and a rear hem facing surface that contacts the rear part.

\* \* \* \* \*